United States Patent [19]
Nadjafi

[11] Patent Number: 5,318,366
[45] Date of Patent: Jun. 7, 1994

[54] FOIL THRUST BEARING WITH VARYING RADIAL AND CIRCUMFERENTIAL STIFFNESS

[75] Inventor: Robert H. Nadjafi, San Pedro, Calif.

[73] Assignee: AlliedSignal Inc., Morris Township, Morris County, N.J.

[21] Appl. No.: 934,839

[22] Filed: Aug. 24, 1992

[51] Int. Cl.⁵ .............................................. F16C 32/06
[52] U.S. Cl. .................................... 384/106; 384/105; 384/124
[58] Field of Search ............................... 384/103–106, 384/121, 124

[56] References Cited

U.S. PATENT DOCUMENTS

| | | |
|---|---|---|
| 3,375,046 | 3/1968 | Marley . |
| 3,635,534 | 1/1972 | Barnett . |
| 3,677,612 | 7/1972 | Barnett et al. . |
| 4,082,375 | 4/1978 | Fortmann . |
| 4,225,196 | 9/1980 | Gray ................. 384/121 X |
| 4,277,111 | 7/1981 | Gray et al. ........... 384/124 |
| 4,277,112 | 7/1981 | Heshmat ............... 384/124 |
| 4,597,677 | 7/1986 | Hagiwara et al. ..... 384/106 X |
| 4,621,930 | 11/1986 | Gu et al. ............. 384/105 |
| 4,624,583 | 11/1986 | Saville et al. ........ 384/105 |
| 4,668,106 | 5/1987 | Gu ..................... 384/105 |
| 4,701,060 | 10/1987 | Gu ..................... 384/106 |
| 5,110,220 | 5/1992 | Gu ..................... 384/105 |

*Primary Examiner*—Thomas R. Hannon
*Attorney, Agent, or Firm*—Joseph R. Black; Robert A. Walsh

[57] ABSTRACT

A spring cluster disc (14) for a foil thrust bearing (10) is provided with a plurality of sets (52) of springs (62,64,66). The springs are configured to provide varying spring force and thus varying stiffness in radial and circumferential directions.

4 Claims, 4 Drawing Sheets

FOIL THRUST BEARING WITH VARYING RADIAL AND CIRCUMFERENTIAL STIFFNESS

TECHNICAL FIELD

This invention relates generally to bearings and, in order of increasing specificity, to hydrodynamic bearings, foil bearings, and foil thrust bearings.

BACKGROUND OF THE INVENTION

The load capacity of a foil thrust bearing depends on the compliance of the bearing with pressure exerted by a fluid film developed between the bearing and the runner. The pressure profile for a thrust bearing varies, and in order to accommodate the optimal pressure profile and attendant fluid film thickness associated with maximum load capacity, the thrust bearing should be designed to provide stiffness which varies in a manner similar to the pressure profile.

Current foil thrust bearings have limited load capacity, and this limitation results from spring designs which indicate only a limited appreciation for variance in pressure profile and its effect on load capacity.

A typical spring design is illustrated in FIGS. 2-6 of U.S. Pat. No. 4,668,106 Gu. While such spring designs provide varying stiffness in radial directions, they provide limited load capacity because of excess pad deflection over the spring support points. The excessive pad deflection leads to a divergent fluid film at the trailing edge of the pad and prevents the bearing from developing an optimal pressure profile. Thus, the advantages associated with providing varying stiffness in both radial and circumferential directions has gone unrecognized.

An objective of this invention is to provide foil thrust bearings with stiffness variation in both radial and circumferential directions.

A further objective of the invention is to provide such stiffness variation in a manner which approximates pressure profiles in both radial and circumferential directions.

Concomitant objectives of the invention are to extend the range of potential applications for foil bearings, and to enable the use of smaller foil bearings in a given application.

SUMMARY OF THE INVENTION

The invention achieves the above-stated objectives by providing a spring cluster disc for a foil thrust bearing, the disc being structurally adapted to provide stiffness which varies in both radial and circumferential directions.

BRIEF DESCRIPTION OF THE DRAWINGS

FIGS. 8 and 9 illustrate these relationships in circumferential and radial dimensions, respectively.

DESCRIPTION OF THE PREFERRED EMBODIMENT

Figure 1:
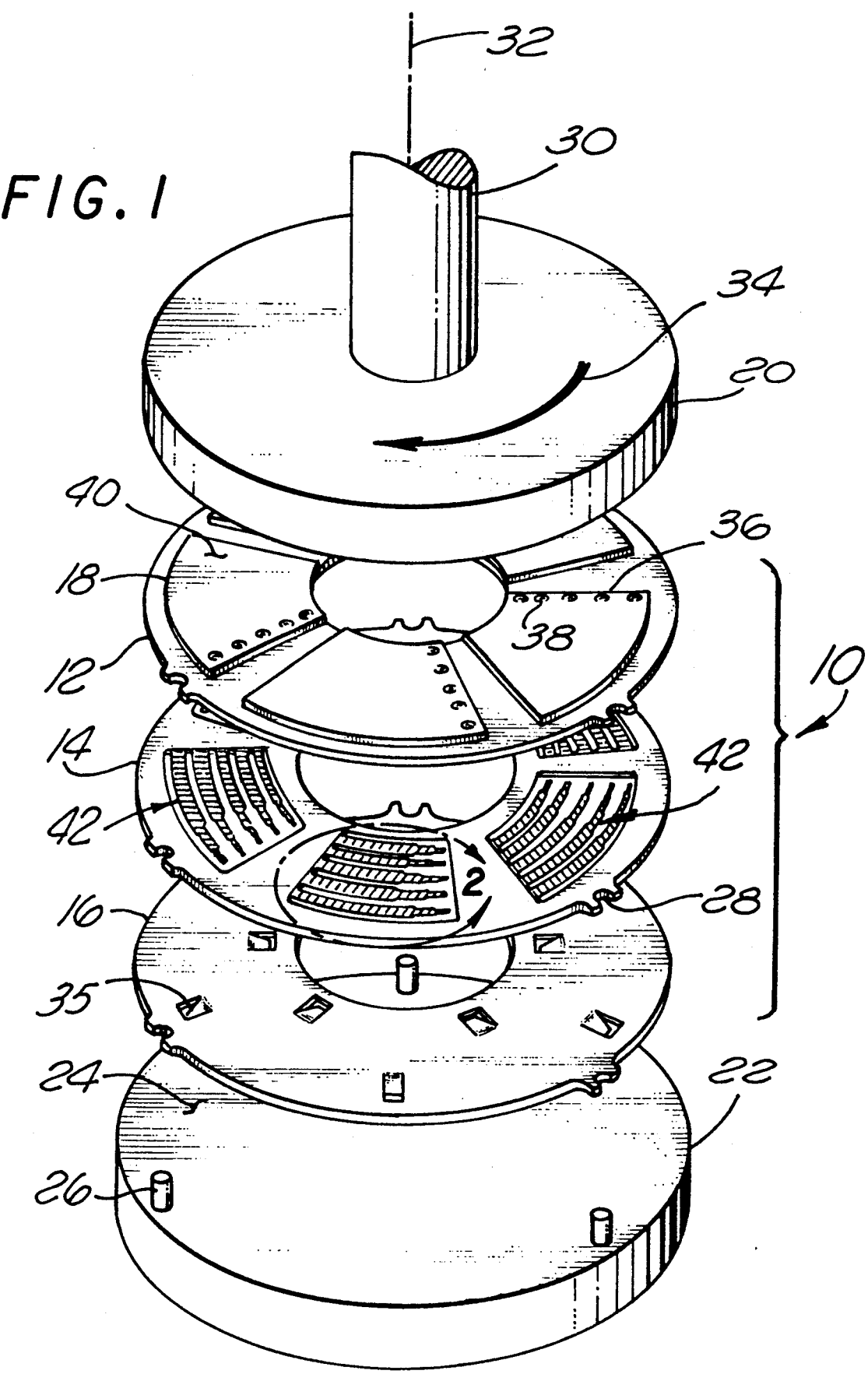
FIG. 1 is a partially exploded, perspective view of a foil thrust bearing embodying the invention, and also illustrates structural members with which the bearing is combined in use.

FIG. 1 illustrates a foil thrust bearing 10 comprised of a stiffener disc 12 (hereinafter, "stiffener"), a spring cluster disc 14 (hereinafter, "spring cluster"), a follower spring disc 16 (hereinafter "follower spring"), and a plurality of compliant, trapezoidal foils or pads (as at 18). Typically, all components are made of conventional nickel-based alloys or stainless steel. However, the selection of materials is application-driven and could include iron-based, copper-based, or aluminum-based alloys, for example.

In use, the bearing 10 is positioned between a runner 20 and a thrust plate 22. The thrust plate 22 may be a separate unit as illustrated, but could also be a portion of a housing or other structural member which is rotationally stationary relative to the runner 20. The thrust plate 22 provides a flat surface 24 generally conformal with the two-dimensional shape of the bearing 10, and is adapted to receive anchoring pins (as at 26) which in turn are received in slots (as at 28) in order to fix the rotational positions of the discs 12,14,16. The runner 20 is rigidly fixed to a shaft 30. The discs 12,14,16 and shaft define a common axis 32. In use, the shaft 30 rotates about the axis 32, the direction of rotation being indicated by the arrow 34.

The follower spring 16, stiffener, 12, and pads 18 may be of conventional design. As embodied in FIG. 1, the follower spring 16 is formed by cutting a preselected number (in the illustrated embodiment, twelve) of U-shaped slots in the plate and bending the resulting tabs 35 outward to form the spring. The spring 16 is preloaded during assembly of the combination illustrated in FIG. 1.

Each pad 18 is fixed near its leading edge (as at 36) to the stiffener 12 by a radially extending plurality of weldments (as at 38). The leading edge 36 is defined by the rotational direction of the runner 20. For each pad 18, the surface (as at 40) that faces the runner 20 is slightly convex, whereas the opposite surface (not shown) that faces the stiffener 12 is slightly concave. The desired curvature of these surfaces varies with the application, and depends upon the available starting torque in a given application. As indicated, the pads 18 are secured to the stiffener 12 such that the latter maintains the pads in collectively annular positional relation. In general, the pads 18 should be minimally spaced while still avoiding interference when flattened by post-startup fluid pressure. The surfaces 40 are coated by conventional means with a solid lubricant.

Figure 2:
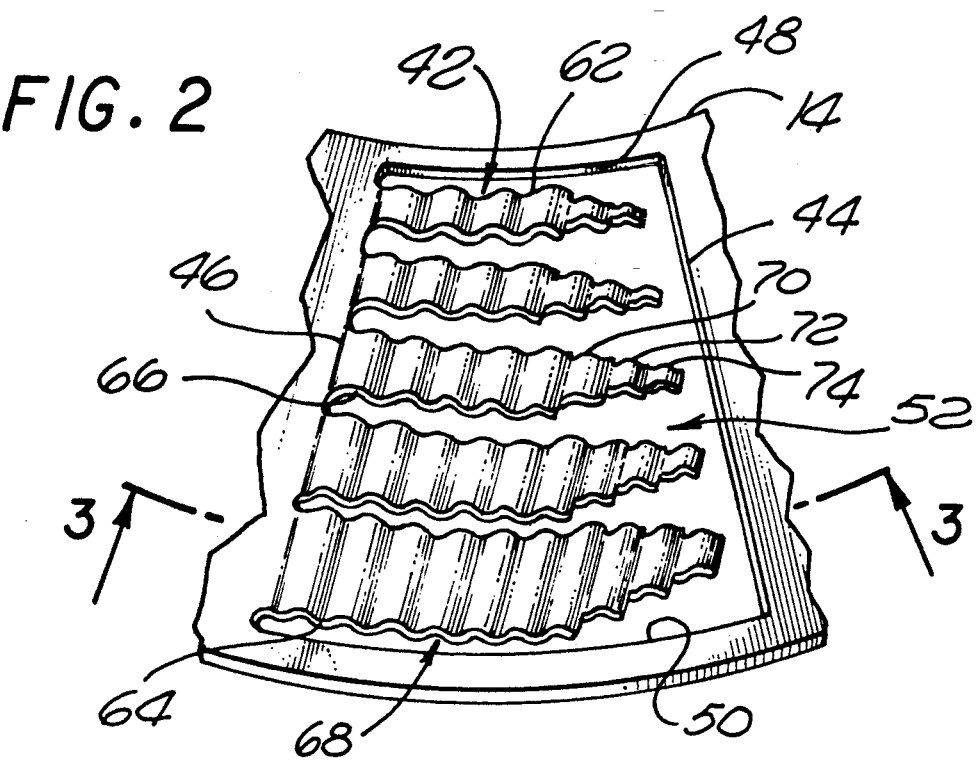
FIG. 2 is a fragmentary perspective view of the spring cluster disc illustrated in FIG. 1.

Referring now to FIGS. 1 and 2, the spring cluster 14 is formed to provide a plurality of substantially trapezoidal areas (as at 42) equal in number to the pads 18. Each area 42 is bounded by a leading radial-line segment (as at 44), a trailing radial-line segment (as at 46), a radially inner arcuate line (as at 48), and a radially outer arcuate line (as at 50). The areas 42 are registered with the foils 18 as indicated in FIG. 1.

Figure 3:
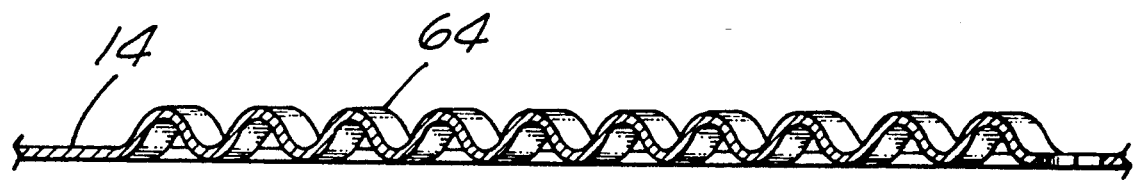
FIG. 3 is a cross-sectional view taken along line 3—3 of FIG. 2.
Figure 6:
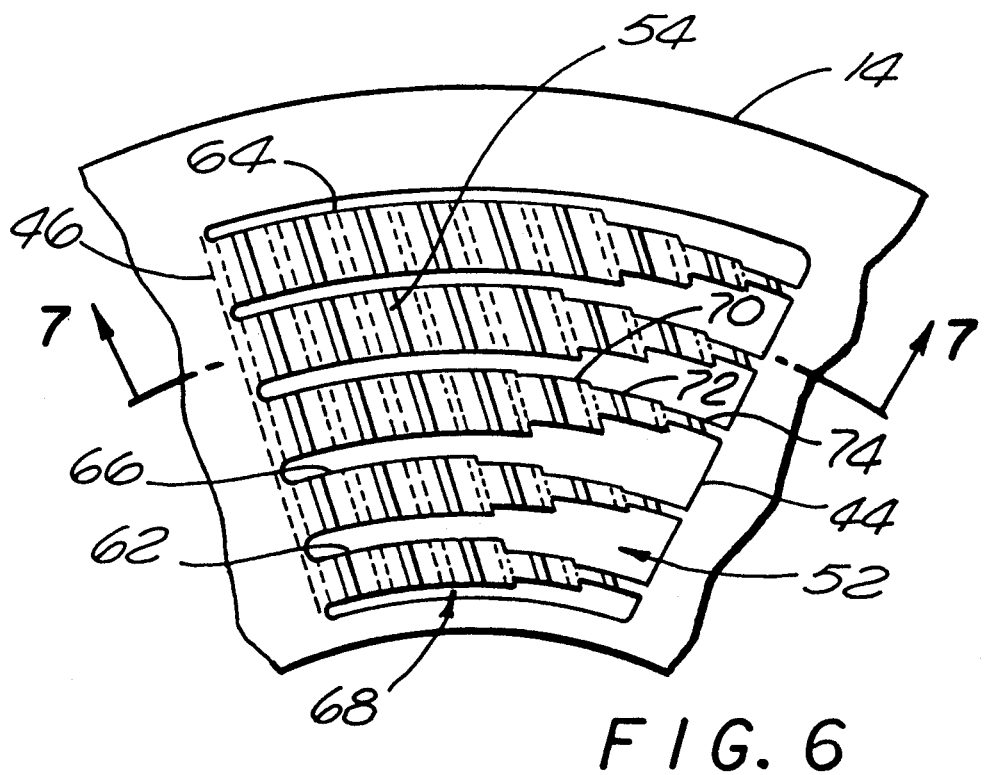
FIG. 6 is a plan view of a segment of the spring cluster disc in an alternative embodiment of the invention.
Figure 7:
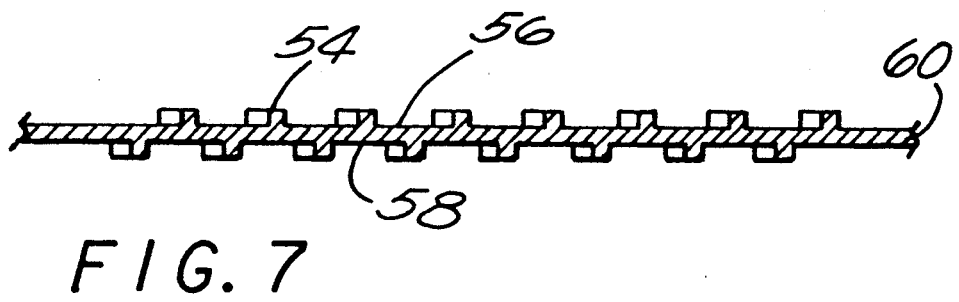
FIG. 7 is a cross-sectional view of an alternative embodiment of the spring illustrated in FIG. 3.

Extending longitudinally from the trailing radial-line segment 46 toward the leading radial-line segment 48 of each area 42 is a set 52 of arcuate springs. The springs 52 may be integral elements of the spring cluster 14, formed thereon by chemical etching. Alternatively, the springs may be individually or collectively formed by various conventional means and then welded or otherwise connected to the spring cluster 14 near the trailing radial-line segments 46 thereof. Each spring is preferably corrugated as shown in FIG. 3. After an initial etching process in which the springs are formed to the desired widths and separated from the leading radial-line segment 46, each spring is stamped in a forming die to form the corrugations. As is illustrated in FIGS. 6 and 7, the springs 52 may alternatively take the form of a series of ridges (as at 54 in FIG. 7) extending in alternating fashion from opposite surfaces 56,58 of a core 60. To facilitate manufacturing, the ridges 54 or corrugations may be angled as shown so that they are parallel with the trailing radial-line segments 46. Such alignment, however, is not necessary.

Referring now to FIGS. 2 and 6, each set of springs 52 includes a radially innermost spring 62, a radially outermost spring 64, and one or more radially intermediate springs (as at 66), a total of five being illustrated in the drawings. However, it is functionally preferable to provide as many springs in each set as is possible in view of dimensional constraints and manufacturing costs. Each spring has a relatively wide longitudinal portion (as at 68) extending from the trailing radial-line segment 46 and subtending about fifty percent of the arcuate length of the spring. Proceeding from the radially innermost spring 62 to the radially outermost spring 64, the longitudinal portion 68 is successively wider for each spring. Proceeding from the trailing radial-line segment 46 toward the leading radial-line segment 44, each spring has successively narrower longitudinally extending portions (as at 70, 72, 74). Alternatively, each spring may be formed to provide a more gradual reduction in its width as it nears its respective leading radial-line segment 44.

In applications demanding relatively thin springs 52, the springs may be supported by a backing disc (not shown) positioned between the spring cluster 14 and the follower spring 16 to prevent buckling.

Figure 5:
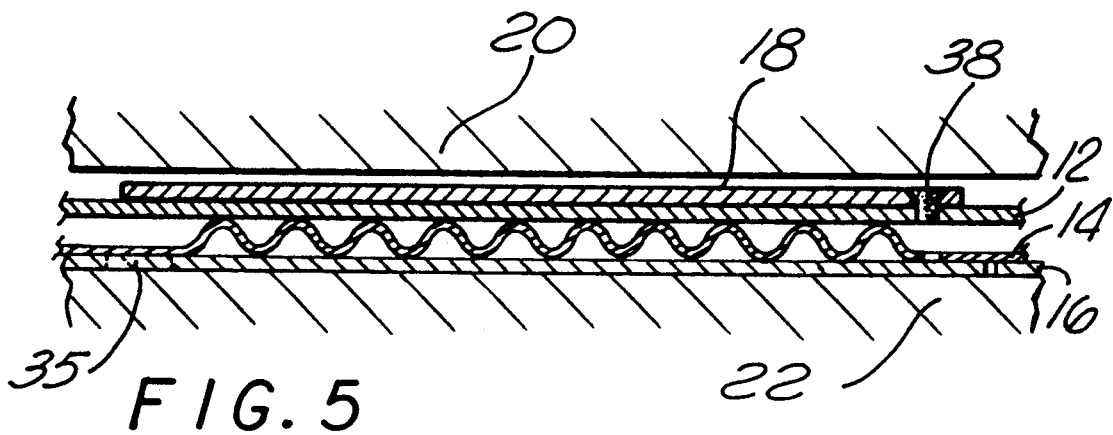
FIG. 5 is a cross-sectional view illustrating the configuration of FIG. 1 in use, taken along an arcuate plane extending longitudinally through one of the corrugated springs shown in FIG. 1.
Figure 8:
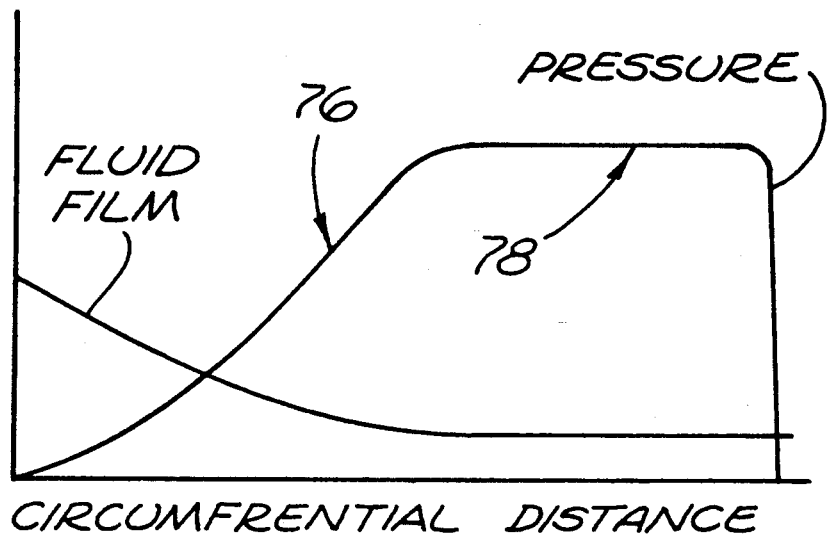
FIGS. 8 and 9 are graphic representations illustrating the relationships between distance and both fluid film thickness and pressure.
Figure 9:
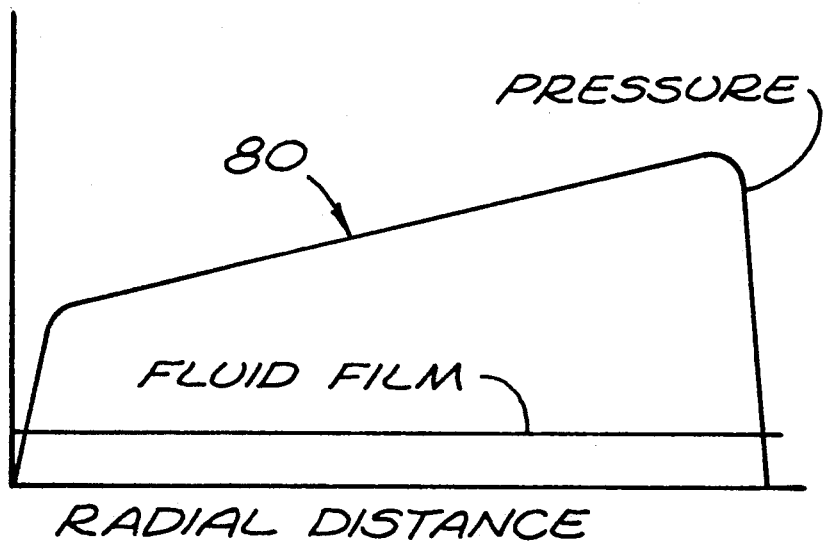

In operation, the bearing 10 is initially biased into contact with the runner 20 by coaction of the follower spring 16 and thrust plate 22. Upon startup, the runner 20 rotates in the indicated direction 34 relative to the pads 18 and an aerodynamic film develops between the pads and runner. The fluid pressure associated with development of the film overcomes the opposing spring force associated with the follower spring 16, and the bearing 10 moves toward the thrust plate 22 until the tabs 35 are flattened relative to the remainder of the follower spring, as indicated in FIG. 5. The pressure gradients associated with the aerodynamic film are illustrated in FIGS. 8 and 9 for the circumferential and radial directions, respectively, of an individual pad. Also illustrated is the thickness gradient of the film. Despite the apparent uniformity indicated in FIG. 9, there is a slight decrease in film thickness with increasing radial distance. In FIG. 8, circumferential distance is measured from the leading edge 36 of the pad 18.

To achieve optimal load capacity and to support the force exerted by the aerodynamic film, the spring cluster 14 is structurally adapted to provide a distribution of spring force that approximates the relationships between pressure and distance. Thus, the width of each spring narrows as it approaches the leading edge 36 of the pad 18, and the associated spring force is thereby made proportional to circumferential distance over a range 76 indicated in FIG. 8. Although the embodiments of FIGS. 2 and 6 provide this proportionality in step-wise fashion, the provision of a smoother gradation more closely approximating the functional relation illustrated in FIG. 8 is within the ambit of the invention, and is limited only by the cost one is willing to incur for analysis and manufacture. Over a second range 78 in which pressure is maximal and substantially constant, each spring has a longitudinal portion 68 of maximal and constant width. There is thus provided for each pad 18 a varying circumferential stiffness that approximates film pressure over the indicated ranges 76,78.

Similarly, the radially innermost spring 62 of each set 52 is narrowest, and each successive spring in the set is wider up to and including the radially outermost spring 64. There is thus provided for each pad 18 a varying radial stiffness that approximates film pressure over the range 80 indicated in FIG. 9.

Figure 4:
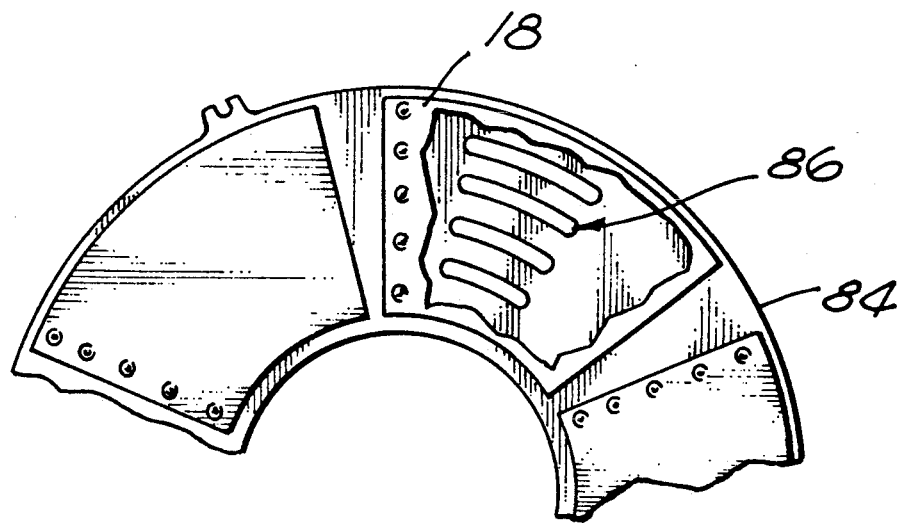
FIG. 4 is a fragmentary plan view of a stiffener disc in an alternative embodiment of the invention.

FIG. 4 illustrates an alternative form of stiffener 84 for applications in which the stiffener 12 is otherwise too rigid to permit development of optimal load bearing capacity over the leading portion of the pads 18. The "leading portion" of the pad is intended to mean that circumferentially extending portion which registers with the narrowing longitudinal portions 70,72,74 of the springs for any given set 52. In such applications, it may be necessary to "soften" the stiffener 12 over the leading portion thereof. To that end a plurality of slots 86 are formed in the stiffener 12 as indicated. The widths of the slots 86 are selected to ensure that the springs of the associated set 52 cannot protrude through the slots.

The foregoing portion of the description, which description includes the accompanying drawings, is intended to serve a pedagogical purpose, and is not intended to restrict the invention to specifically described or illustrated details which are ancillary to the teaching contained herein.

What is claimed is:

1. Spring cluster apparatus for a foil thrust bearing, comprising in combination:
   a disc defining an axis thereof and forming two opposed surfaces, the surfaces surrounding a common plurality of arcuately extending trapezoidal regions, each region subtending an angle extending in a first circumferential direction from a respective first radial-line segment defining a respective first circumferential border of the region to a respective second radial-line segment defining a respective second circumferential border of the region, each region extending in a radial direction from a radially inner line defining a first radial border of the region to a radially outer line defining a second radial border of the region, whereby the regions collectively define an annular region of the disc;
   for each of the trapezoidal regions, a plurality of radially spaced springs connected to or integral with the disc and extending from the respective first circumferential border toward the respective second circumferential border, each plurality of springs being structurally adapted to provide spring forces which vary with radial distance from the axis;

the springs of each plurality comprising a radially innermost spring having a first width determined in a respective radial direction, a radially outermost spring having a second width greater than the first width and also determined in the radial direction, and a radially intermediate spring having a third width greater than the first width but less than the second width and also determined in the radial direction.

2. Spring cluster apparatus for a foil thrust bearing, comprising in combination:

a disc defining an axis thereof and forming two opposed surfaces, the surfaces surrounding a common plurality of arcuately extending trapezoidal regions, each region subtending an angle extending in a first circumferential direction from a respective first radial-line segment defining a respective first circumferential border of the region to a respective second radial-line segment defining a respective second circumferential border of the region, each region outer liner defining a second radial border of the region, whereby the regions collectively define an annular region of the disc;

for each of the trapezoidal regions, a plurality of radially spaced springs connected to or integral with the disc and extending from the respective first circumferential border toward the respective second circumferential border, each plurality of springs being structurally adapted to provide spring forces which vary with circumferential distance from the second radial-line segment and with radial distance from the axis;

the springs of each plurality comprising a radially innermost spring having a first width determined in a respective radial direction, a radially outermost spring having a second width greater than the first width also determined in the radial direction, and a radially intermediate spring having a third width greater than the first width but less than the second width and also determined in the radial direction.

3. Apparatus as in claim 2 wherein the springs longitudinally extend in a circumferential direction and comprise a plurality of longitudinal segments which are progressively narrower in the circumferential direction.

4. Apparatus as in claim 3 wherein the springs are corrugated.

* * * * *